June 3, 1958  R. KELLER  2,837,710
GENERATOR CONTROL SYSTEM
Filed May 21, 1956
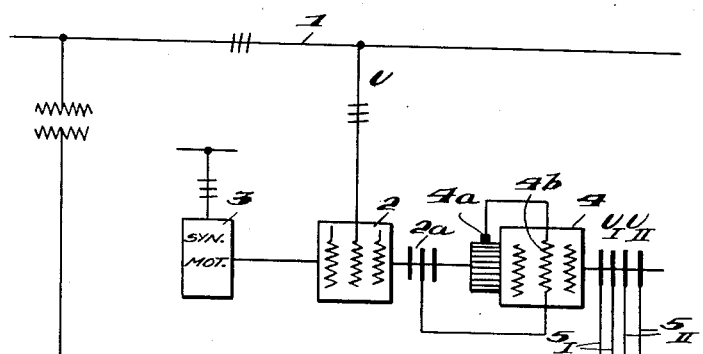
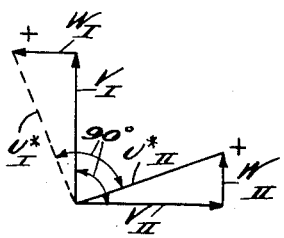
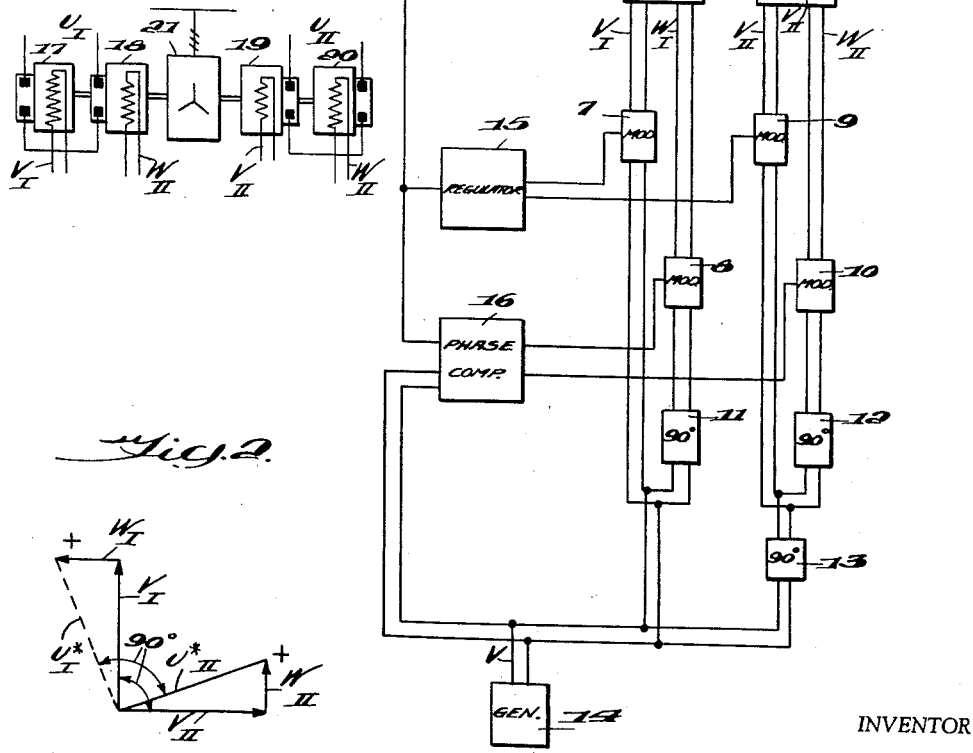
INVENTOR
Robert Keller
BY
ATTORNEYS

United States Patent Office 2,837,710
Patented June 3, 1958

2,837,710
GENERATOR CONTROL SYSTEM

Robert Keller, Ennetbaden, Switzerland, assignor to Aktiengesellschaft Brown, Boveri & Cie., Baden, Switzerland, a joint-stock company Application May 21, 1956, Serial No. 586,152

Claims priority, application Switzerland May 21, 1955

2 Claims. (Cl. 322—24)

The present invention relates to apparatus for producing three-phase electrical energy whose voltage is maintained in proper phase relation to that of a primary control voltage having a constant frequency, i. e. a frequency having a high order of constancy.

In television equipment, particularly, three-phase current supply systems are required in which the system voltage must be maintained in a proper phase relation with that of a primary supply voltage having a very high order of frequency constant. The control voltage is usually supplied from a generator whose voltage output has a frequency, e. g. 50 cycles/sec. controlled by a crystal oscillator. The output frequency of such generators has a constancy of the order of from $10^{-6}$ to $10^{-7}$ as compared with a frequency constant of the order of $10^{-2}$ of the ordinary, local current supply network. If it is attempted to obtain the desired constancy of frequency and phase relation by corresponding control and regulation of the speed of a motor-generator set, practically insuperable difficulties would be encountered due to the mass influence of the rotary elements. Hence, regulation of the frequency with the required high order of constancy must be effected without being influenced by the speed of rotating masses. The present inventive concept is based upon the idea of producing the three-phase energy with a high order of frequency constancy by means of a synchronous machine with a rotary field excitation and wherein the phase position of the rotary field of the rotor is determined by a phase comparison between the primary control voltage and the voltage produced by the synchronous machine, and the phase difference is reduced to a minimum.

As the synchronous machine with rotary field excitation, there is provided an asynchronous machine having a rotor provided with slip rings, and an exciting current of lower frequency is supplied to these rings from a rotary frequency changer or converter which is rigidly coupled to the rotor of the asynchronous machine so that the two are always rotated in synchronism. A synchronous motor is used to drive the rotors of the asynchronous machine and the frequency changer at a substantially constant speed, the synchronous motor receiving its power from any convenient source of commercial power supply. If desired, the synchronous motor can be replaced with a servo motor.

The rotor of the frequency changer is provided with two pairs of slip rings and these pairs receive respectively alternating current voltages which are 90° out of phase with respect to each other from a crystal oscillator controlled alternating current generator and which, being crystal controlled, produces its alternating current voltage at a frequency with a high degree of constancy. The collector brushes of the frequency changer are connected to the slip rings on the rotor of the asynchronous machine.

The feeding of the frequency changer with two voltages of constant frequency and which are 90° out of phase with respect to each other makes it possible to maintain constant the medium frequency in the receiver power system, and the present invention makes it possible to reduce phase fluctuations to a minimum.

In the accompanying drawings which illustrate practical embodiments of the invention, Fig. 1 is an electrical schematic diagram showing the various electrical components in the system and the circuit connections therebetween;

Fig. 2 is a vector diagram showing the phase relationship between the various voltage components which supply the input voltages to the two pairs of slip rings on the frequency changer; and Fig. 3 is an electrical schematic diagram showing a modified construction for the intensifier units incorporated in the Fig. 1 circuit.

With reference now to Fig. 1, the network which is to be supplied with three-phase power having a high degree of frequency constant is indicated by numeral 1. In the interest of avoiding undue complications in the drawings, only one of the three phases has been shown in the circuit diagram. However it will be understood that the other two phases are like the one illustrated. The network 1 is supplied with three-phase power from an asynchronous generator 2, the output voltage U of which is to be maintained practically in locked phase relation with a primary control alternating voltage the frequency of which has a very high order of constancy. The rotor of generator 2 is driven by a synchronous motor 3 which receives its power from the usually available commercial power supply system. The rotor element of a frequency changer 4 is rigidly coupled to the rotor of generator 2 and the collector brushes 4a of the frequency changer 4 are connected through the exciting windings 4b of the frequency changer to the slip rings 2a on the rotor of generator 2. As previously explained, to simplify illustration, the connections for only one phase of the various components have been shown.

Two exciting alternating voltages $U_I$ and $U_{II}$ which are 90° out of phase with respect to each other are supplied to the rotor element of the phase changer 4 by means of intensifiers $6_I$ and $6_{II}$ through two slip ring pairs $5_I$ and $5_{II}$ which, shifted by 90°, are impressed upon the rotor windings. The control of the intensifiers is effected by corresponding control alternating voltages $U^*_I$ and $U^*_{II}$ which are also out of phase with respect to each other by 90°. As indicated in Fig. 2, the control voltage $U^*_I$ derived from generator 14 is comprised of two voltage components $V_I$ and $W_I$ which are 90° out of phase with respect to each other, and in a similar manner the control voltage $U^*_{II}$ likewise derived from generator 14 is comprised of two voltage components $V_{II}$ and $W_{II}$ which are 90° out of phase with respect to each other. The magnitude of the control voltage component $V_I$ for intensifier $6_I$ is regulated by means of a modulator 7 which is controlled by a voltage regulator unit 15 in interrelation to the magnitude of the system voltage U produced by the asynchronous machine 2. The magnitude of the control voltage component $V_{II}$ for intensifier $6_{II}$ is regulated in a similar manner by means of a modulator 9 which is controlled by the voltage regulator 15.

The magnitude of the other control voltage component $W_I$ for intensifier $6_I$ is regulated by means of a modulator 8 which is controlled by a phase regulator 16 in interrelation of the phase angle between the primary control voltage V, which is the output of the crystal oscillator controlled generator 14, and the network voltage U constituting the output of asynchronous generator 2. In a similar manner the other control voltage component $W_{II}$ for intensifier $6_{II}$ is regulated by means of the modulator 10 which is likewise controlled by the phase regulator 16. The phase positions of the control voltages required, in accordance with the relationships shown in the vector diagram of Fig. 2 are obtained in such a manner that the primary control voltage V for the intensifier $6_{II}$ is first preliminarily dephased by 90° through the phase changer 13. As already explained each of the intensifiers $6_I$ and $6_{II}$ is supplied with, apart from the voltage components $V_I$ and $V_{II}$ derived from generator 14, the additional voltage components $W_I$ and $W_{II}$ which are dephased by 90° through additional 90° phase changing devices 11 and 12 before being applied to their respective modulators 8 and 10.

The voltage regulator 15 functions in such manner that the network voltage U is maintained constant. For this purpose it regulates the voltage components $V_I$ and $V_{II}$ through the modulators 7 and 9 respectively in consideration of the just available voltage components $W_I$ and $W_{II}$ so that the resulting components $U^*_I$ and $U^*_{II}$ or the resulting network voltage U are constant. The phase regulator 16 governs, through the modulators 8 and 10, the components $W_I$ and $W_{II}$ in accordance with the instantaneous phase position of the network voltage U in relation to the primary control voltage V, so as to obtain a minimum difference in phase between the voltages U and V.

The circuit arrangement in accordance with the invention is such that load fluctuations in the network 1 do not cause fluctuations in the frequency of the network voltage U. This is due to the fact that the frequency of the network voltage U corresponds exactly to the frequency on the slip rings 5, and fluctuations in speed of the frequency changer 4 are reflected in the frequency. Phase fluctuations, caused by load fluctuations, are diminished by the phase regulator 16. Herein a type of phase feedback is effective. The greater this feedback, the smaller are the remaining phase differences. Such differences in phase are maintained so insignificant that they do not disturb the operation of the television apparatus receiving its power supply from the network 1.

In lieu of a fixed frequency characteristic of the primary control voltage V, a variable frequency can be used. In such case, load and frequency fluctuations will not be associated with any speed modification since there are no mechanical masses present which would influence the regulating process.

The intensifiers $6_I$ and $6_{II}$ can be constructed as tube type amplifiers, in which event the control voltage components $V_I$, $W_I$ and $V_{II}$, $W_{II}$ for these intensifiers are added. In lieu of tube type intensifiers, an arrangement as shown in Fig. 3 can be employed. Here it will be seen that the voltage component $V_I$ is produced by a generator 17 having an external field excitation and which is driven by a synchronous motor 21 which receives its power from the same commercial power supply as the synchronous motor 3. In a similar manner, the other voltage components $V_{II}$ and $W_I$ and $W_{II}$ are produced by generators 18, 19 and 20, respectively which are likewise driven by the motor 21. The voltage outputs of generators 17 and 18 are connected in series addition to form the voltage component $U_I$ and the voltage outputs of generators 19 and 20 are connected in series addition to form the voltage component $U_{II}$.

In conclusion, while a preferred embodiment of the invention has been described and illustrated it is to be understood that the same may be modified in certain particulars without, however, departing from the spirit and scope of the invention as defined in the appended claims.

I claim:

1. Apparatus for producing a three-phase alternating network voltage as a power supply for television equipment and the like requiring a high order of frequency constant comprising an asynchronous generator, a frequency changer, motor means driving the rotors of said generator and frequency changer in synchronism, circuit means connecting the collector brushes on said frequency changer through the exciting windings thereof to the slip rings connected to the rotor winding of said generator, first and second pairs of slip rings on the rotor of said frequency changer connected to the rotor winding, a first intensifier unit for supplying said first pair of slip rings with a first alternating voltage, a second intensifier unit for supplying said second pair of slip rings with a second alternating voltage 90° out of phase with respect to said first alternating voltage, a primary alternating voltage generator having a high order of frequency constant, a first alternating control voltage for said first intensifier unit comprising two alternating voltage components 90° out of phase with respect to each other and which are derived from said primary alternating voltage generator, a second alternating control voltage for said second intensifier unit 90° out of phase with respect to said first alternating control voltage comprising two alternating voltage components 90° out of phase with respect to each other and which are likewise derived from said primary alternating voltage generator, a first phase modulator for one of the alternating voltage components of said first alternating control voltage, a second phase modulator for the corresponding alternating voltage component of said second alternating control voltage, and means controlling said phase modulators in accordance with the instantaneous phase difference between said three-phase network voltage supplied by said asynchronous generator and the voltage produced by said primary control voltage generator in such sense as to reduce said phase difference.

2. Apparatus as defined in claim 1 and which further includes amplitude modulators for the other alternating voltage components of said first and second alternating control voltages, and means controlling said amplitude modulators in dependence upon the amplitude of said three-phase network voltage in such sense as will tend to maintain the latter at a constant amplitude.

References Cited in the file of this patent

UNITED STATES PATENTS 2,481,659    Guanella _____ Sept. 13, 1949